H. W. & R. LAFFERTY.
Centrifugal Sugar Machine.
No. 3,153. Reissued Oct. 6, 1868.
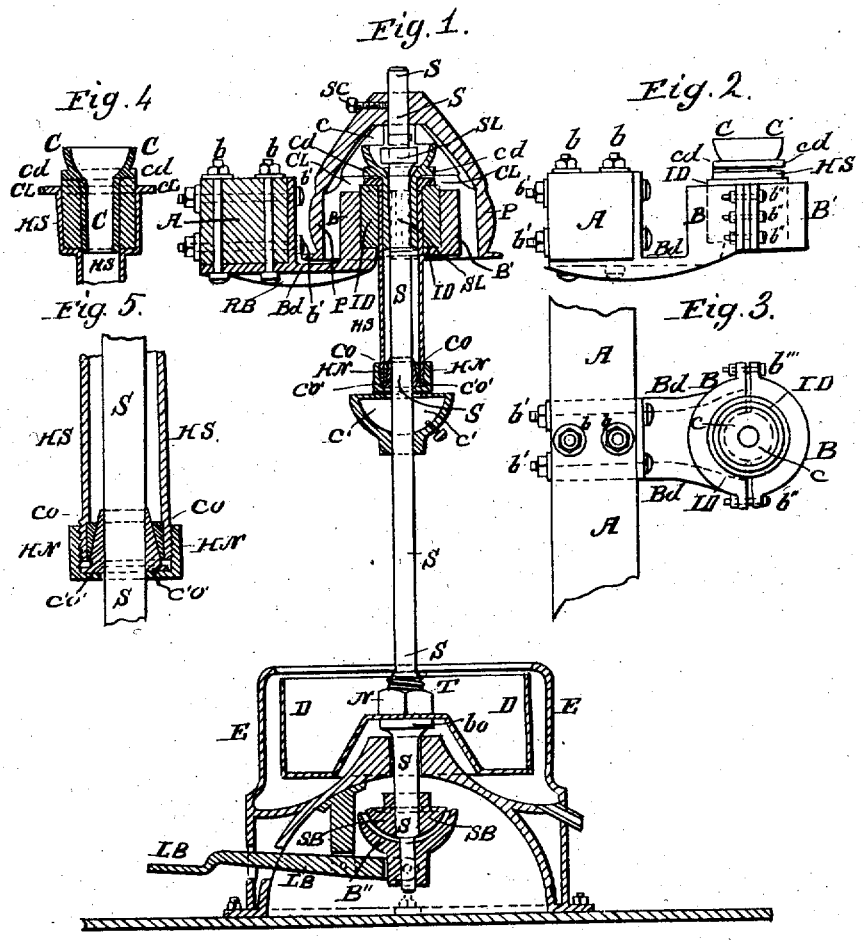
Witnesses:
Inventors:
Hugh W. Lafferty
Robert Lafferty
per their attorney
d'Urquhart & Co

UNITED STATES PATENT OFFICE.

HUGH W. LAFFERTY AND ROBERT LAFFERTY, OF GLOUCESTER, N. J.

IMPROVEMENT IN CENTRIFUGAL MACHINES FOR DRAINING SUGAR, &c.

Specification forming part of Letters Patent No. 77,054, dated April 21, 1868; Reissue No. 3,153, dated October 6, 1868.

*To all whom it may concern:*

Be it known that we, HUGH W. LAFFERTY and ROBERT LAFFERTY, of Gloucester, in the county of Camden and State of New Jersey, have invented a new and useful Improvement in Centrifugal Machines for Draining Sugar and other Purposes; and we do hereby declare the following to be a full and exact description thereof, reference being had to the accompanying drawings, forming a part of this specification, in which—

Figure 1 is a sectional elevation of our centrifugal machine. Fig. 2 is an elevation of the suspending device; Fig. 3, a plan view of Fig. 2; Fig. 4, a sectional elevation of a modified form for the hollow shaft of the machine. Fig. 5, an enlarged sectional view, illustrating the connection and combination of the hollow stay-shaft with the inclosed solid driving-shaft of the cylinder of our machine.

Similar letters indicate like parts in all of the figures.

The nature of our invention consists, first, in providing a firm but elastic support or stay to the driving or revolving shaft or spindle carrying the cylinder or basket of a centrifugal draining-machine at a point intermediate between the cylinder and the support or flexible bearings of the said driving-shaft, for the purpose of restraining the eccentricity of movement to which the cylinder is liable, and to prevent such an undue strain or jar thereof as would cause the shaft to break; second, in an improved elastic seat from which to suspend the revolving driving-shaft carrying the cylinder or basket of the machine; third, in an improved packing joint and bearing for the stay applied to the driving-shaft; fourth, in the application of a brake to the lower end of the driving-shaft below the suspended cylinder; and, fifth, in the combination of the revolving shaft of our improved machine with the bottom of the casing of the cylinder as found in the ordinary forms of centrifugal machines, so as to admit of the advantageous application of our improvements to such old machines.

Our improved machine consists of a cylinder or basket, D, of any of the approved forms usually employed in centrifugal draining-machines, and which is secured to and suspended upon a solid vertical driving shaft or spindle, S, in the customary manner, within an outer casing, E, of the ordinary form. The vertical driving-spindle S passes through the cylinder D, which is secured thereto, and which extends down centrally through the bottom of the casing E into the open space below the same. The aperture in the casing through which it passes is of such a diameter as to allow the spindle free play therein, but yet to restrict any excess in the obicular motion of the cylinder in its revolutions. This aperture may be advantageously lined with india-rubber or other elastic material. The casing E of the machine may rest and be supported in the usual manner upon the floor. The spindle or shaft S of the revolving cylinder D is suspended from and supported by a collar and sleeve, S L, firmly secured thereto near its upper end, and forming a journal therefor. This journal-sleeve S L rests and works in suitable bearings formed within an oil-cup, C, embracing the same, the lower portion of the cup being extended into a neck closely embracing the sleeve S L, so as to provide it with an extended bearing-surface. The oil-cup C thus made to constitute the bearing of the spindle or shaft S, and from which the spindle and its cylinder D are suspended, is provided exteriorly with a flange, C L, or other device to support the same, and may be supported directly upon a fixed brace, B, a beam, or other rigid support; but we prefer to support the same upon an elastic seat interposed between its bearings and such rigid support, as hereinafter described.

To prevent the danger of a fracture of the solid vertical driving-shaft S from the effect of an unequal disposition of weight in its attached cylinder D and at the same time steady it and prevent in some measure the vibration and jar thereof found in the ordinary centrifugal machines, we provide an auxiliary elastic stay-bearing for the spindle or shaft S at a point intermediate between its suspensory flexible bearing and its attached cylinder. Such auxiliary support for the shaft may be obtained without obstructing free access to the suspended cylinder by placing upon the driving-shaft S a fixed hollow shaft, H S, firmly secured with an elastic connection to a suitable support above.

In our improved machine we prefer to combine the support of the driving-shaft S with that of its auxiliary stay-shaft H S to obtain greater neatness and compactness therein. To this end we cause the upper end of the hollow stay-shaft H S to embrace closely the extended neck of the oil-cup C, containing the bearings of the driving-shaft S, so that said cup shall rest upon and be supported by the hollow shaft. The hollow shaft is then upheld and supported by means of an outer flange upon and about its upper edge, which rests upon a thick heavy band or cushion, I D, of india-rubber or other elastic material, firmly bound and clamped against the same between the jaws or divisions of a brace or hanger, B B′, which may form part of a bracket to be secured in a beam, A, as illustrated in Figs. 2 and 3 of the drawings, or be otherwise sustained from or between beams or standards provided for the support of the machine. The two divisions B B′ of the hanger are clamped together upon the rubber cushion I D by means of bolts and nuts *b b′*, affording a firm secure support therefor, yet admitting an adjustment of the elastic tension of the cushion upon the shaft H S to regulate its rigidity. It will be observed that the elastic cushion I D, which forms a seat for the shaft H S, is extended and made to embrace a considerable portion of the shaft, so that while it permits a certain freedom of movement thereto, yet it offers a constantly-increasing resistance to any departure of the shaft from a true vertical position. To impart this elastic restraining force to the driving supporting-shaft of the cylinder D, so that it shall not only prevent a vibration thereof and restrain its eccentric movement under the influence of an unequal distribution of weight in the cylinder, but also firmly support the same at its weakest point, we form a close bearing between the lower end of the hollow shaft H S and the central driving-shaft, S, the point of bearing and consequent support being fixed and determined at pleasure by the length of said hollow shaft. To obtain this desired bearing, the lower end of the shaft H S is threaded exteriorly, and is interiorly beveled to form a conical seat, or is otherwise fitted with a circular conical seat, *c o*, to receive a split or divided conical washer, *c′ o′*, inserted therein and made to embrace the shaft or spindle S closely. This conical washer *c′ o′* is held in place and forced upward in its seat by means of a hollow nut or cap, H N, through which the spindle or shaft S passes, and which screws upon the thread on the exterior of the lower end of the hollow shaft. The hollow nut may be suitably packed to form a close joint, and it is evident that the pressure of the conical washer *c′ o′* (thus forming a bearing between the stay-shaft H S and the driving-shaft S) upon the shaft S may be adjusted and stiffened or relieved at pleasure by screwing or unscrewing said nut. The bearing is kept constantly lubricated by the oil passing down the spindle from the oil-cup C above. To arrest the further passage of oil down the shaft S, a water-cup, *c′*, is secured thereon below the end of the hollow shaft H S.

Motion is imparted to the shaft S and its cylinder D by means of a pulley, P, secured to its upper end. This pulley is made to extend in cap form down over the bearings of the spindle, as illustrated in Fig. 1, so as to bring the driving-belt placed thereon in the same plane as the point of suspension and support of the fixed hollow shaft and revolving shaft.

Fig. 4 shows the shape we give the top end of our hollow shaft when we find it desirable in practice to have the elastic cushion D inside of the same interposed between it and the solid shaft S. The horizontal position of the cylinder D is maintained, while a certain freedom to swerve under the influence of an unequal load is nevertheless obtained by an extension of the spindle or shaft S down through the aperture formed in the casing E of the cylinder. The casings of the ordinary forms of centrifugal machines may be used with our improved suspended cylinders without alteration by a simple removal of the step and devices used in such machines for supporting the lower end of the spindle or shaft. The extension of the lower end of the driving-shaft S down through the bottom of the casing prevents all danger of injury to the operatives in charge of the machine from an accidental breakage of the spindle or shaft, for in such case the cylinder is at once caught and supported by the casing.

In order to check the revolution of the cylinder D in our machine, we apply a brake to the lower extended end of the shaft S, as illustrated in Fig. 1 of the drawings. This brake consists of a convex button or head, S B, upon the end of the shaft S, upon and against which a counterpart concave piece, B′, is brought to bear at pleasure by means of a treadle-lever, L B.

Although we prefer to obtain an intermediate elastic stay or support for the revolving shaft carrying the cylinder of our machine at a point removed from the flexible joint upon or by which the shaft is suspended, either auxiliary to or independent of an elastic bearing at or near said joint by means of a hollow shaft arranged as described, which affords an elastic restraining force both at or near the point of suspension, and also at the point of greatest strain upon the revolving shaft, as hereinbefore described, yet we contemplate attaining the same end by other equivalent devices—as, for instance, by diagonal or horizontal braces, provided with elastic cushions, and extending from outer supports to and against the revolving shaft.

Having thus fully described our invention, what we claim therein as new, and desire to secure by Letters Patent, is—

1. In combination with the swinging revolving shaft S of a centrifugal draining-machine, an elastic stay applied to said shaft at a point intermediate between its flexible joint or bearings and its attached cylinder, substantially as herein set forth.

2. The combination of a fixed hollow shaft, H S, with the suspending and driving shaft S of a centrifugal machine, to afford stay or support thereto, substantially as herein set forth.

3. The combination of an extended elastic ring or band, D D′, with the outer upper end of a fixed auxiliary stay-shaft, H S, combined with the revolving shaft S of a centrifugal machine, to form a seat and stay for the same, substantially as herein specified.

4. The combination of the conical divided washer *c′ o′*, encircling the shaft S, with a conical seat, *c o*, in the end of an inclosing-shaft, H S, and with a hollow nut, H N, working against said washer, substantially as herein set forth.

5. A friction-brake, B′, operating against the lower end of the driving suspending-shaft S of a centrifugal machine, substantially as herein set forth.

6. The combination of the lower extended extremity of the driving and suspending shaft S of a centrifugal machine with the bottom of the casing thereof, substantially as herein set forth.

7. The combination of a waste-cup, *c′*, with the shaft or spindle S of a centrifugal machine, to prevent the passage of oil down into the basket or cylinder thereof, substantially as herein set forth.

HUGH W. LAFFERTY.
ROBERT LAFFERTY.

Witnesses:
W. C. MULFORD,
SAML. D. MULFORD.